(12) United States Patent
Haraguchi

(10) Patent No.: US 10,033,884 B2
(45) Date of Patent: Jul. 24, 2018

(54) IMAGING SYSTEM, IMAGING CONTROL METHOD THEREFOR, IMAGING CONTROL APPARATUS, RADIATION DETECTOR, AND STORAGE MEDIUM

(71) Applicant: CANON KABUSHIKI KAISHA, Tokyo (JP)

(72) Inventor: Tomohiko Haraguchi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/881,327

(22) Filed: Oct. 13, 2015

(65) Prior Publication Data

US 2016/0112582 A1   Apr. 21, 2016

(30) Foreign Application Priority Data

Oct. 16, 2014 (JP) ................ 2014-211991

(51) Int. Cl.
*H04N 1/00* (2006.01)
*H04N 1/32* (2006.01)
*H04N 5/232* (2006.01)

(52) U.S. Cl.
CPC ..... *H04N 1/00209* (2013.01); *H04N 1/32128* (2013.01); *H04N 1/32374* (2013.01); *H04N 5/23206* (2013.01)

(58) Field of Classification Search
CPC ........... H04N 1/00209; H04N 1/32128; H04N 1/32374; H04N 5/23206; H04N 1/00095; A61B 6/56; A61B 6/563

USPC ......................................... 348/207.11; 378/1
See application file for complete search history.

(56) References Cited

U.S. PATENT DOCUMENTS

| | | | | |
|---|---|---|---|---|
| 2002/0158970 A1* | 10/2002 | Takeshi | ............... | H04N 5/23206 348/211.3 |
| 2004/0145660 A1* | 7/2004 | Kusaka | ............... | H04N 1/32101 348/211.2 |
| 2006/0142059 A1* | 6/2006 | Ishiguro | ............. | H04N 1/32363 455/556.1 |
| 2006/0221377 A1* | 10/2006 | Nishio | ............... | H04N 1/32619 358/1.14 |
| 2009/0022276 A1 | 1/2009 | Ohara | | |
| 2009/0046828 A1* | 2/2009 | Ohta | .................... | A61B 6/4283 378/1 |
| 2010/0315675 A1* | 12/2010 | Yagi | .................. | H04N 1/32037 358/1.15 |

FOREIGN PATENT DOCUMENTS

| | | | | |
|---|---|---|---|---|
| JP | 2006-263320 | 10/2006 | | |
| JP | 2006263320 A | * 10/2006 | ............... | H04N 5/32 |
| JP | 2013-094487 A | 5/2013 | | |
| WO | 2006095538 A1 | 9/2006 | | |

* cited by examiner

*Primary Examiner* — Nhan T Tran
(74) *Attorney, Agent, or Firm* — Fitzpatrick Cella Harper and Scinto

(57) ABSTRACT

An imaging system captures an image by detecting, by a sensor, radiation from a radiation generating apparatus, and transmits image data of the image captured by the sensor to a controller. The controller includes a control unit configured to control whether to permit the use of the sensor, based on whether the sensor already holds the captured image data at the time of connection of the sensor.

15 Claims, 12 Drawing Sheets

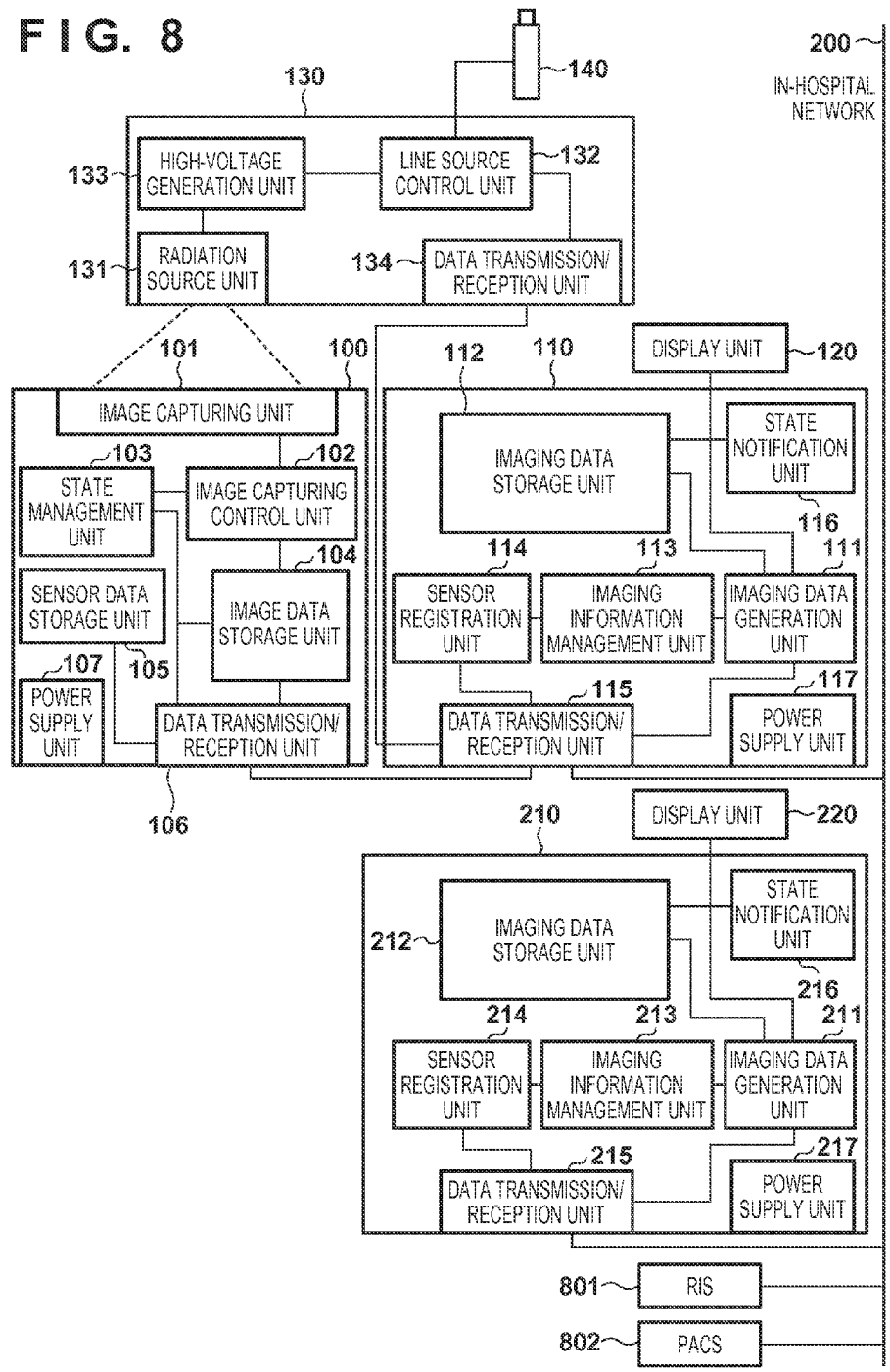

IMAGING SYSTEM, IMAGING CONTROL METHOD THEREFOR, IMAGING CONTROL APPARATUS, RADIATION DETECTOR, AND STORAGE MEDIUM

BACKGROUND OF THE INVENTION

Field of the Invention

The present invention relates to an imaging system, and an imaging control method therefor, an imaging control apparatus, a radiation detector, and a storage medium and, more particularly, to a technique of appropriately holding an image captured by detecting radiation obtained upon irradiation.

Description of the Related Art

In a medical diagnostic field, radiation images have been used. In general, a system for capturing a radiation image includes a radiation generating apparatus for performing irradiation with radiation, a flat panel sensor (to be referred to as a sensor hereinafter) for detecting radiation obtained upon irradiation and generating a radiation image, and a control PC for controlling these apparatuses. When the radiation generating apparatus performs irradiation with radiation by a switch operation by a user or the like, the control PC drives the sensor to transmit a radiation image generated by the sensor to the control PC. When imaging succeeds, the control PC displays the radiation image received from the sensor on a connected monitor or the like, and then the user can confirm the image.

If the control PC cannot receive the image due to, for example, an operation error of the sensor or a communication failure between the control PC and the sensor, it is necessary to prevent the captured image from being lost by holding the image in the sensor. If the captured image is lost, it is necessary to perform imaging again, thereby increasing the burden on a patient due to ineffective exposure. To prevent an increase in burden in advance, there has been developed a sensor in which a storage area is provided so that the sensor can temporarily hold a captured image when the image cannot be normally transmitted.

In general, a hospital often has a plurality of imaging rooms where radiation imaging is performed. Radiation imaging systems installed in the respective imaging rooms are not always the same and different radiation imaging systems may be installed in the respective imaging rooms. As a sensor used for a recent radiation imaging system, a wireless sensor requiring no cable connection has been developed to improve the usability, and one wireless sensor can be used in a plurality of imaging rooms. Assume that imaging has been performed by a wireless sensor in the first imaging room but transmission of an image has failed, and thus the untransmitted captured image is held in the sensor. When an attempt is made to perform imaging using the wireless sensor in this state in the second imaging room, the image captured in the first imaging room may be unwantedly transmitted to a system in the second imaging room. In this case, since the system which has received the image does not hold the patient information, imaging information, and the like of the received image, it cannot link the captured image with correct patient information, and thus cannot generate normal imaging data. As a result, an image lost state is set for the patient, and it becomes necessary to perform imaging again.

Japanese Patent Laid-Open No. 2006-263320 discloses a technique for solving the above problem. That is, when turning off the power of a control PC which receives an image captured by a sensor, whether the sensor holds an untransmitted image is confirmed. When it can be confirmed that the sensor holds no untransmitted image, the power is turned off, thereby preventing an image loss.

In the method described in Japanese Patent Laid-Open No. 2006-263320, however, an image may be erroneously transmitted when imaging is performed using the same sensor in another system before the power of a system which has performed imaging is turned off. If the power of the sensor has already been turned off to stop the function when turning off the power of the control PC, it is impossible to confirm the presence/absence of an untransmitted image, and an image may be erroneously transmitted.

The present invention has been made in consideration of the above problems, and provides an imaging technique of preventing untransmitted captured image data from being erroneously transmitted to an inappropriate controller when a sensor holds the untransmitted captured image data.

SUMMARY OF THE INVENTION

According to one aspect of the present invention, there is provided an imaging system for capturing an image by detecting, by a sensor, radiation from a radiation generating apparatus, and transmitting image data of the image captured by the sensor to a controller, wherein the controller includes a control unit configured to control whether to permit the use of the sensor, based on whether the sensor already holds the captured image data at the time of connection of the sensor.

According to another aspect of the present invention, there is provided an imaging control apparatus for receiving image data of an image captured by detecting, by a sensor, radiation from a radiation generating apparatus, comprising: a control unit configured to control whether to permit the use of the sensor, based on whether the sensor already holds the captured image data at the time of connection of the sensor.

According to still another aspect of the present invention, there is provided a radiation detector for obtaining radiation image data by detecting radiation from a radiation generating apparatus, comprising: a storage unit configured to hold the radiation image data; a communication unit configured to perform communication with one of a plurality of controllers capable of controlling the radiation detector, and a control unit configured to control whether to permit imaging under control of a first controller, based on whether the radiation image data obtained under control of a second controller is held in the storage unit at the time of connection to the first controller.

Further features of the present invention will become apparent from the following description of exemplary embodiments (with reference to the attached drawings).

BRIEF DESCRIPTION OF THE DRAWINGS

FIG. 8 is a block diagram showing a system configuration according to the sixth embodiment.

DESCRIPTION OF THE EMBODIMENTS

Embodiments of the present invention will be described below with reference to the accompanying drawings. Note that the following embodiments are not intended to limit the claims of the present invention, and that not all the combinations of features described in the embodiments are necessarily essential to the solving means of the present invention.

<First Embodiment>

Figure 1:
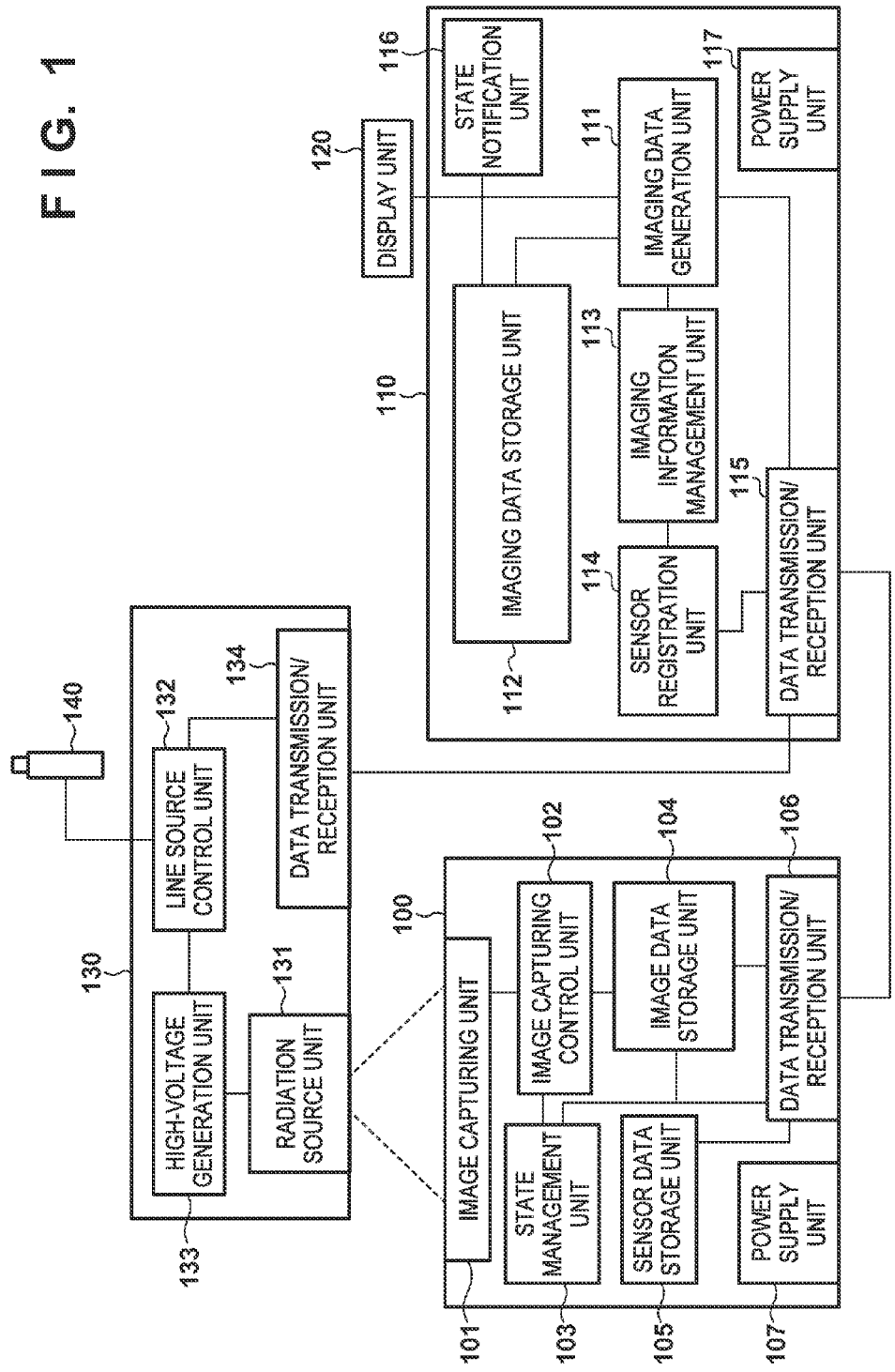
FIG. 1 is a block diagram showing a system configuration according to the first embodiment.
Figure 2:
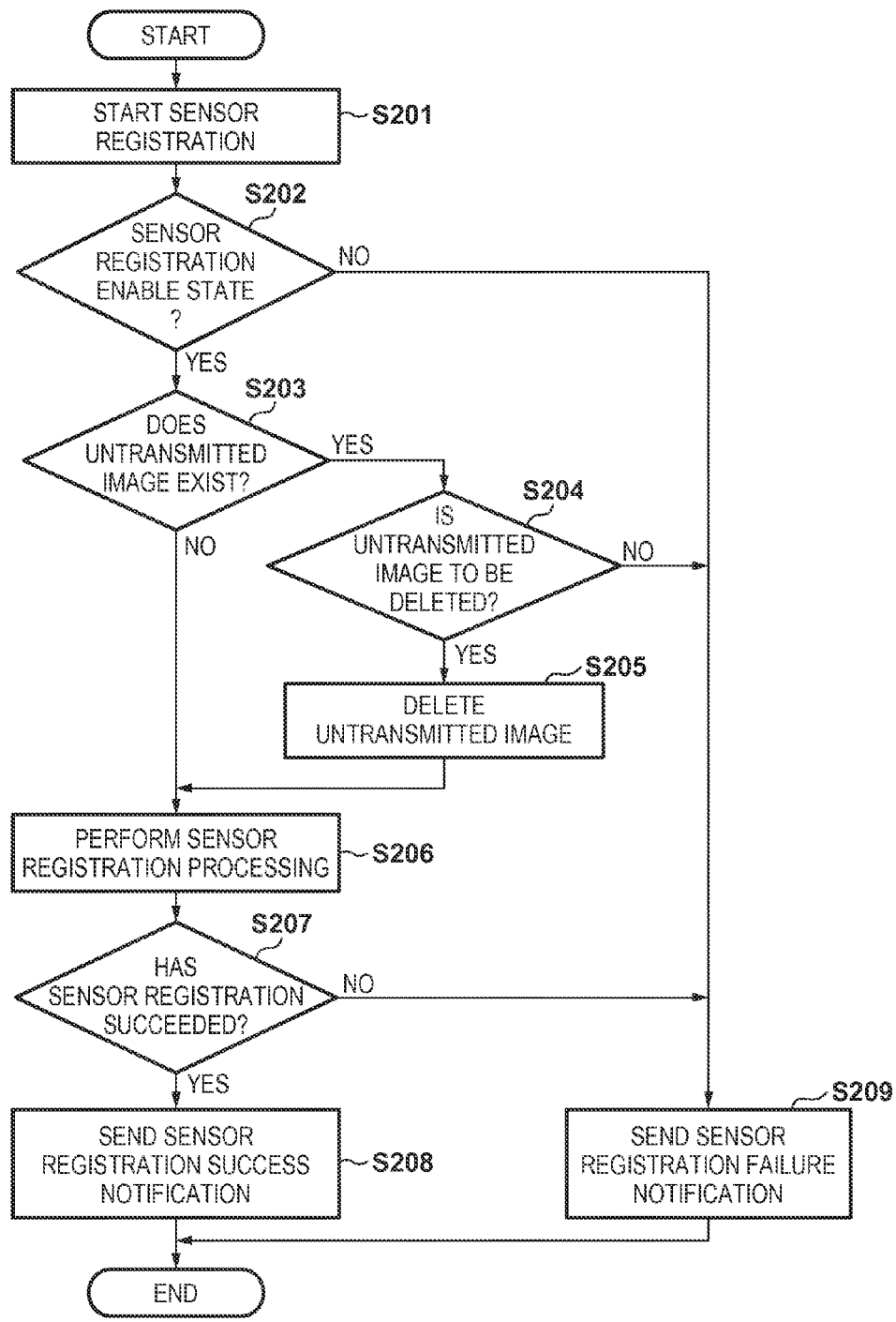
FIG. 2 is a flowchart illustrating sensor registration processing according to the first embodiment.

A radiation image obtaining processing system according to this embodiment is an imaging system for capturing an image by detecting, by a sensor, a radiation from a radiation generating apparatus, and transmitting the captured image data to a controller. FIG. 1 is a block diagram showing the configuration of the system according to the first embodiment. FIG. 2 is a flowchart illustrating sensor registration processing according to the first embodiment. The system configuration will be described with reference to FIG. 1. The procedure of the sensor registration processing according to this embodiment will be described with reference to FIG. 2.

Apparatus Arrangement

As shown in FIG. 1, the radiation image obtaining processing system includes a radiation generating apparatus 130 for generating radiation, a radiation detector 100 for detecting radiation obtained upon irradiation and generating a radiation image, and a control PC 110 serving as an imaging control apparatus capable of controlling these apparatuses. The radiation detector (to be referred to as a sensor hereinafter) 100 can also be used when it is connected to another radiation image obtaining processing system, that is, another control PC by canceling a connection to the control PC 110 in this system. If transmission of an image fails when imaging is performed by the sensor 100 in the first system, the sensor 100 keeps holding the untransmitted captured image. In this state, when the sensor 100 is used in the second system, the captured image may be erroneously transmitted. Note that the sensor 100 and the control PC 110 may be connected by wired or wireless connection.

The arrangement of the sensor 100 will be explained first. The sensor 100 converts radiation energy obtained upon irradiation from the radiation generating apparatus 130 into an electric signal, creates a digital radiation image, and transmits the image to the control PC 110.

An image capturing unit 101 converts the radiation energy received from the radiation generating apparatus 130 into a charge amount, and the charges are accumulated in the capacitors of pixels arranged in a matrix pattern. The accumulated charges are A/D-converted via TFT (Thin Film Transistor) switches and charge amplifiers, and read out as digital values. The TFT switch is a transistor on a thin film and is a semiconductor element for performing a switching operation. The TFT switches are switched between ON and OFF for each row to perform scanning and read the pixels of the entire screen, thereby obtaining a radiation image.

An image capturing control unit 102 is constituted by a multiprocessor unit, and appropriately controls the image capturing unit 101 in accordance with the state of the sensor 100 which is managed by a state management unit 103. For example, when the sensor 100 is in the standby state, the image capturing unit 101 is controlled to perform idling driving for refreshing charges accumulated in the capacitors of the image capturing unit 101 and reading pixel information. When the sensor 100 is in the ongoing imaging state, the image capturing unit 101 is controlled to perform reading driving for accumulating charges for a predetermined time, energizing the charge amplifier, and then reading image information. These driving methods are set in advance as driving programs in the multiprocessor unit. The image capturing control unit 102 adds, as a header, sensor information (to be described later) to the radiation image data obtained by the image capturing unit 101, and stores the resultant data in an image data storage unit 104.

The state management unit 103 is also constituted by a multiprocessor unit, and manages the state of the sensor 100. The state of the sensor 100 transits in accordance with a control signal received from the control PC 110 or the radiation generating apparatus 130. The states of the sensor 100 are roughly classified into three states: an imaging enable state, ongoing imaging state, and standby state. The state management unit 103 receives a signal from the control PC 110 via a data transmission/reception unit 106, compares the signal with the current driving state of the image capturing unit 101, and when driving needs to be switched, transmits a signal to instruct the image capturing control unit 102 to switch driving. The state management unit 103 also manages contents of the image data stored in the image data storage unit 104.

The image data storage unit 104 is a storage area for temporarily storing image data generated by the image capturing unit 101, and is constituted by a semiconductor storage device such as a ROM or flash memory. The image data storage unit 104 has a storage capacity for data of at least one image, and can have even a capacity for data of a plurality of images depending on the operation method. If image transmission from the sensor 100 to the control PC 110 fails, image data is held in this storage area.

A sensor data storage unit 105 is a storage area formed from a semiconductor storage device, and holds data (sensor information) unique to the sensor 100. The sensor information mainly includes the serial number of the sensor 100, its manufacturing number, and its communication information such as an IP address necessary for communication with an external device. When notifying the control PC 110 or the like of the sensor information, data in the sensor data storage unit 105 is transmitted outside. As described above, sensor information is added to image data held in the image data storage unit 104.

The data transmission/reception unit 106 externally transmits the image data generated by the image capturing unit 101 and the sensor information held in the sensor data storage unit 105. When the data transmission/reception unit 106 communicates with the control PC 110 by using the TCP/IP protocol and Ethernet®, the IP address and port number of the sensor 100 are set in the data transmission/reception unit 106 prior to the start of communication. A data transmission/reception unit 115 of the control PC 110 is similarly set and communication is established using these pieces of information. The data transmission/reception unit 106 has no role of determining whether to transmit image data. If an image transmission start signal is received from the data transmission/reception unit 115 of the control PC 110, image data existing in the image data storage unit 104 is transmitted. When an image transmission start signal is received while no image data is held in the image data storage unit 104, an error signal is returned.

A power supply unit 107 is constituted by a battery or the like, and supplies power for normally operating the sensor 100.

The arrangement of the control PC (to be referred to as a PC hereinafter) 110 will be described next. The PC 110 controls irradiation with radiation by the radiation generating apparatus 130, receives, from the sensor 100, image data captured by detecting the radiation by the sensor 100, and manages the image data as imaging data. For example, a radiation image is displayed on a display unit 120 such as a monitor, and then presented to the user. A desktop, notebook, or tablet computer is generally used as the PC 110, and includes an operation input unit (not shown) such as a mouse and keyboard.

An imaging data generation unit 111 links patient information and imaging information set by the user prior to imaging with image data received by the data transmission/reception unit 115, thereby generating imaging data to be finally output. The generated imaging data is saved in an imaging data storage unit 112. By transferring the imaging data to the display unit 120 connected to the PC 110, the user can confirm the captured image.

The imaging data storage unit 112 is constituted by a solid-state drive (SSD) for a magnetic storage device such as a hard disk or a large-capacity storage device using a semiconductor memory, and saves the imaging data generated by the imaging data generation unit 111. Furthermore, an external storage device such as PACS (Picture Archiving and Communication System) can be used as the imaging data storage unit 112 to transfer the imaging data.

An imaging information management unit 113 is constituted by a magnetic storage device or a semiconductor memory device, and manages sensor information, and patient information and imaging information including an imaging method, which are designated by the user at the time of imaging. The patient information may be input by the user by using an input device such as a keyboard and mouse, or automatically obtained from a server (not shown). An imaging method, a sensor type to be used for imaging, and the like are also designated as the imaging information. As for the sensor information, the sensor information such as the serial number which is held in the sensor data storage unit 105 of the sensor 100 is obtained, and managed as a data table. Describing the sensor information in the data table is equivalent to sensor registration. If the sensor 100 to be used by the user at the time of imaging is designated, the PC 110 obtains the sensor information registered in the imaging information management unit 113, and links it with the imaging data.

Based on the sensor information received by the data transmission/reception unit 115, a sensor registration unit 114 determines whether the sensor 100 can be registered in the PC 110. If the sensor 100 can be registered, sensor registration is performed. Sensor registration processing according to this embodiment is processing in which the sensor registration unit 114 transmits the information (sensor information) of the sensor 100 to the imaging information management unit 113 and registers it in the data table so as to allow imaging using the sensor 100 connected to the PC 110. At the time of sensor registration, communication with the PC 110 is set in the sensor 100. Note that even if it is determined to register the sensor 100, if the sensor information of the sensor 100 is already held in the imaging information management unit 113, no sensor registration is newly performed.

In this embodiment, it is possible to use only a sensor (sensor 100) registered in the PC 110. That is, it is possible to perform imaging by connecting the sensor to the PC 110. In other words, a sensor which is not registered in the PC 110 cannot be used for imaging even if it is connected to the PC 110.

The data transmission/reception unit 115 has the same role as that of the data transmission/reception unit 106 of the sensor 100, and sets in advance information for establishing communication to exchange image data, sensor information, and the like.

A state notification unit 116 notifies the user of the imaging enable state of the system, start of imaging, end of imaging, success of sensor registration, or the like. In this notification processing, various methods can be used. For example, the PC 110 generates a sound, emits light, displays a message on the display unit such as a monitor, or generates a sound using an external apparatus. For example, a notification may be sent to the user by connecting an LED emission apparatus or the like to the PC 110, and transmitting a communication command to cause the LED emission apparatus to emit light at the time of sensor registration.

A power supply unit 117 supplies power to the entire PC 110.

The arrangement of the radiation generating apparatus 130 will be described next. The radiation generating apparatus 130 performs irradiation with radiation by applying a high voltage generated from a high-voltage generation unit 133 to a radiation source unit 131. A line source control unit 132 controls the output of the high-voltage generation unit 133 based on irradiation conditions set by the PC 110 via a data transmission/reception unit 134. Note that the user may set a tube current, a radiation duration, and the like as the irradiation conditions in the PC 110 prior to imaging.

Note that an irradiation switch 140 is a switch for controlling irradiation with radiation by the radiation generating apparatus 130 in accordance with a user instruction. Irradiation with radiation from the radiation generating apparatus 130 is performed while the user presses the irradiation switch 140, and ends when the user releases the irradiation switch 140.

Note that the radiation generating apparatus 130 need only irradiate the sensor 100 with radiation. For example, if irradiation conditions are set in advance, the radiation generating apparatus 130 need not be connected to the PC 110.

As described above, in the radiation image obtaining processing system according to this embodiment, the radiation generating apparatus 130 irradiates an object with radiation, and the sensor 100 detects radiation having passed through the object, thereby capturing a radiation image. Therefore, the radiation image captured by the sensor 100 should be transmitted to the PC 110 which has performed control at the time of imaging, and stored in the imaging data storage unit 112 as imaging data linked with imaging information and sensor information by the imaging data generation unit 111. That is, the sensor 100 can be connected to a PC other than the PC 110 but a radiation image captured while the sensor 100 is connected to the PC 110 can be processed as imaging data by only the PC 110.

Sensor Registration Processing

The sensor registration processing in the radiation image obtaining processing system according to this embodiment will be described with reference to FIG. 2. To perform imaging by the sensor 100 in this system, it is necessary to register in advance the sensor 100 in the PC 110. The sensor registration processing according to this embodiment is processing of registering information of the sensor 100 in the PC 110 and setting communication with the PC 110 in the sensor 100 so as to control imaging using the sensor 100 connected to the PC 110. The sensor registration processing according to this embodiment is mainly controlled by the sensor registration unit 114 of the PC 110, and has as its feature to determine whether sensor registration is possible depending on whether the sensor 100 holds an untransmitted image.

Prior to imaging using the sensor 100, the user performs a sensor registration start operation when the sensor 100 is connected to the PC 110 (step S201). To perform sensor registration, it is necessary to set communication between the sensor 100 and the PC 110. If communication is performed using the TCP/IP protocol, information such as the IP address, subnet mask, and port number of the PC 110 and information such as an IP address, subnet mask, and port number to be set in the sensor 100 as a communication partner are set in advance. If a wireless sensor is used as the sensor 100, it is necessary to set a communication band, a communication channel, and the like in addition to the above information.

The sensor registration unit 114 confirms with the state management unit 103 of the sensor 100 whether the communication setting processing in step S201 is complete and the sensor 100 is in the registration enable state (step S202). The registration enable state of the sensor indicates a state in which the sensor is not in the imaging enable state, ongoing imaging state, or standby state. If the sensor is in the registration disable state (NO in step S202), the sensor registration unit 114 transmits a signal indicating a sensor registration failure to the sensor 100 (step S209).

If the sensor 100 is in the registration enable state (YES in step S202), the sensor registration unit 114 confirms with the sensor 100 whether the sensor 100 holds an untransmitted image (step S203). Upon receiving the confirmation request, the sensor 100 causes the state management unit 103 to confirm whether an untransmitted image is held in the image data storage unit 104, and transmits untransmitted image holding information indicating the confirmation result to the PC 110 via the data transmission/reception unit 106. More specifically, the sensor 100 generates an image existence flag as an integer parameter which takes a value n indicating the number of untransmitted images when untransmitted images are held and a value of 0 when no untransmitted images are held, and transmits the parameter to the PC 110. The PC 110 receives the parameter, and determines based on the parameter whether an untransmitted image is held in the sensor 100 to undergo registration processing.

If the sensor 100 holds an untransmitted image (YES in step S203), the sensor registration unit 114 confirms with the user whether to perform the sensor registration processing by deleting the untransmitted image or interrupt the sensor registration processing while holding the untransmitted image (step S204). For example, a message including information about the untransmitted image is displayed on the display unit 120, and a user instruction is received.

If the user selects to continuously hold the untransmitted image (NO in step S204), the sensor registration unit 114 determines that sensor registration is impossible, and transmits a signal indicating a sensor registration failure to the state management unit 103 of the sensor 100 (step S209), thereby terminating communication. In this case, the sensor 100 is not registered in the PC 110. The sensor registration unit 114 notifies the user of a message indicating that the sensor 100 holds the untransmitted image and thus sensor registration is impossible, and also prompts the user to transmit the untransmitted image by connecting the sensor 100 to another appropriate control PC.

On the other hand, if the user selects to delete the untransmitted image (YES in step S204), the sensor registration unit 114 transmits an image deletion instruction to the sensor 100. When the sensor 100 receives the image deletion instruction, the state management unit 103 updates the state of the sensor 100 so as to set a state in which the untransmitted image has been erased (step S205). At this time, the untransmitted image in the image data storage unit 104 may be actually erased, or the image data storage unit 104 may be set in a state in which it can be overwritten by next image data while holding the untransmitted image intact. Upon completion of updating the sensor state, the sensor 100 transmits, to the PC 110, a sensor registration enable signal indicating that the untransmitted image has been deleted and preparation for sensor registration has been completed.

Upon receiving the sensor registration enable signal, the PC 110 returns, to the sensor 100, a confirmation signal indicating that the sensor registration unit 114 is to start the sensor registration processing, thereby starting the sensor registration processing (step S206). Note that if the sensor 100 holds no untransmitted image (NO in step S203), the process directly advances to the sensor registration processing (step S206).

The sensor registration processing is processing of saving, in the imaging information management unit 113, sensor information necessary for performing imaging using the sensor 100 connected to the PC 110, and transmitting communication settings necessary for communication with the PC 110 to the state management unit 103 of the sensor 100. The serial number of the sensor 100, sensor characteristic information, and the like are mainly saved in the PC 110, and the IP addresses of the PC 110 and sensor 100 and the like are transmitted to the sensor 100. Note that in step S206, if the sensor 100 has already been registered in the imaging information management unit 113, no new registration processing is performed and it is considered that sensor registration has already succeeded.

If incorrect information exists in communication information during the sensor registration processing in step S206, the sensor registration unit 114 interrupts the sensor registration processing, and transmits a signal indicating a sensor registration failure to the sensor 100 (steps S207 and S209). When all pieces of communication information are normally set and sensor registration is complete, the sensor registration unit 114 transmits a signal indicating sensor registration completion to the sensor 100 (step S208), thereby terminating the sensor registration processing. If the PC 110 fails to register the sensor 100, the sensor 100 cannot be used for imaging, and thus neither reception of image data nor generation of imaging data in the PC 110 is performed, as a matter of course.

Note that the untransmitted image which has been determined in step S204 not to be deleted is continuously held in the sensor until the user connects the sensor to an appropriate control PC used when capturing the untransmitted image and performs a transmission operation of the image.

After the sensor registration processing succeeds in this way, the PC 110 manages the registered sensor information in the imaging information management unit 113. When new sensor information is saved, the imaging information management unit 113 transmits sensor registration success information to the state notification unit 116 to notify the user that the sensor registration processing has succeeded. Then, the state notification unit 116 notifies the user that sensor registration has succeeded but a notification method is not limited.

As described above, according to this embodiment, when connecting the sensor to the control PC, if the sensor holds an untransmitted image, it is controlled not to register the sensor in the control PC (in this example, the PC 110) which does not correspond to the untransmitted image. This can prevent the untransmitted image from being erroneously transmitted to an inappropriate controller, and prevent in advance an image data loss or a recognition error.

Note that an example in which the sensor registration unit 114 of the PC 110 determines whether sensor registration is possible has been described. However, this determination processing can be performed on the side of the sensor 100. In this case, the state management unit 103 can manage the existence of an untransmitted image in the image data storage unit 104 and, upon receiving a sensor registration start signal, determine based on the presence/absence of an untransmitted image whether sensor registration is possible.

<Second Embodiment>

The second embodiment of the present invention will be described below. In the above-described first embodiment, an example in which whether sensor registration is possible in the control PC is determined depending on whether the sensor holds an untransmitted image has been explained. In the method described in the first embodiment, it is possible to prevent a loss of an untransmitted image but if a status in which an untransmitted image in the sensor cannot be transmitted to an appropriate PC continues for some reason, it is impossible to connect the sensor to another control PC and use it, resulting in difficulty in operating the sensor. Therefore, if the sensor holds an untransmitted image when performing the sensor registration processing, it is desirable to perform processing of transmitting the untransmitted image if the PC has captured the untransmitted image. After this transmission processing, it is possible to perform the sensor registration processing in an arbitrary PC, thereby improving the operation efficiency of the sensor.

The arrangement of a radiation image obtaining processing system according to the second embodiment is the same as that shown in FIG. 1 of the first embodiment and a detailed description thereof will be omitted. In the second embodiment, even if sensor information of a sensor 100 is not held in an imaging information management unit 113, if the sensor 100 holds an untransmitted image, a sensor registration unit 114 determines whether the untransmitted image has been captured while being connected to the self system, that is, a PC 110. If the untransmitted image has been captured by the self system, the sensor 100 is registered; otherwise, no sensor registration is performed.

Figure 3:
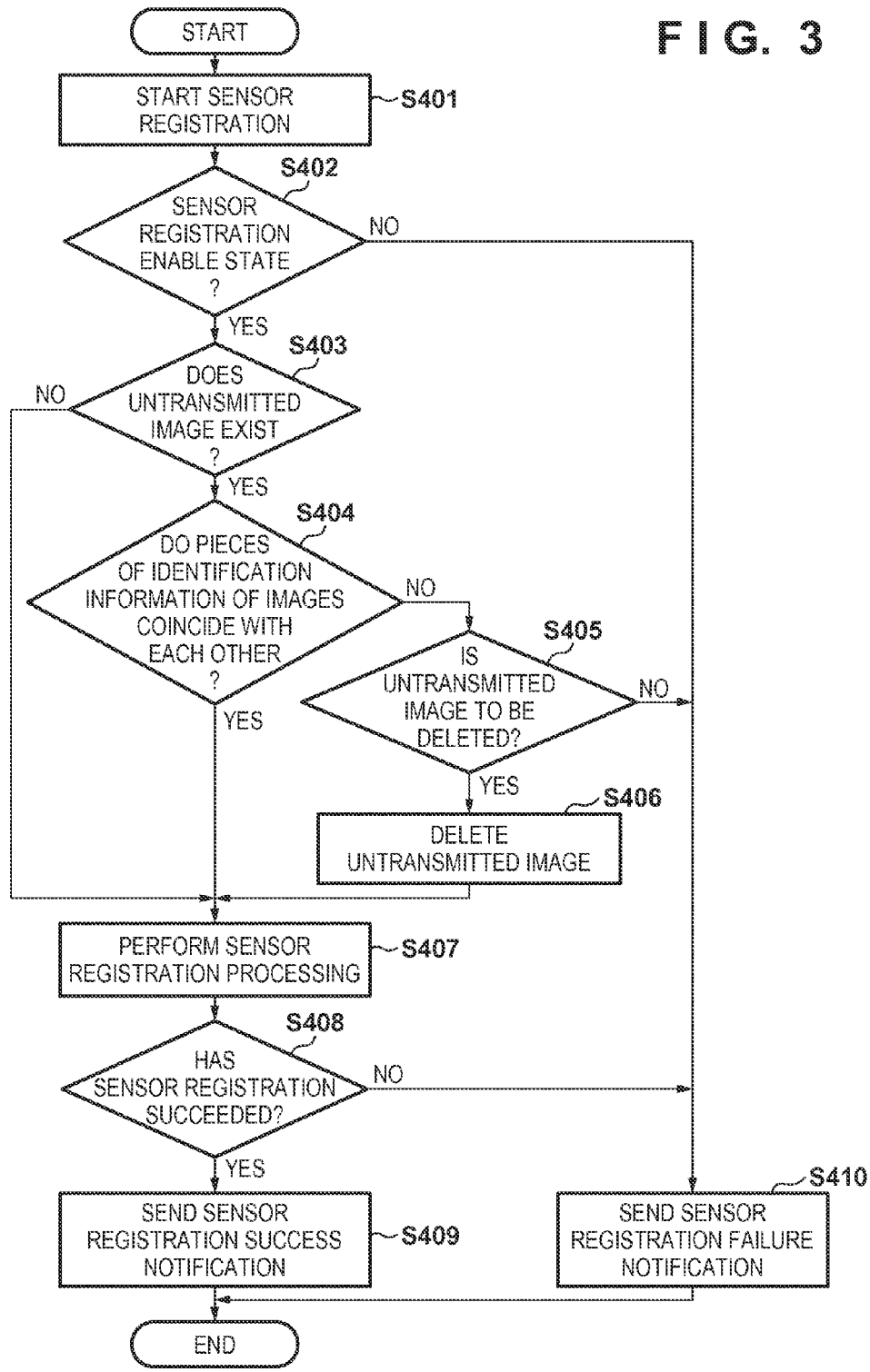
FIG. 3 is a flowchart illustrating sensor registration processing according to the second embodiment.

FIG. 3 is a flowchart illustrating sensor registration processing in the PC 110 according to the second embodiment. As in the first embodiment, after the state is changed to the sensor registration enable state (step S402) by a sensor registration start operation by the user (step S401), the sensor registration unit 114 determines whether the sensor 100 holds an untransmitted image (step S403). If the sensor 100 holds no untransmitted image, the sensor registration unit 114 performs the sensor registration processing (step S407), as in the first embodiment.

On the other hand, if the sensor 100 holds an untransmitted image, it is confirmed whether the PC 110 holds imaging information to be linked with the untransmitted image, that is, whether the PC 110 holds information of an unreceived image corresponding to the untransmitted image (step S404). The sensor registration unit 114 inquires of the sensor 100 about identification information of the untransmitted image. Upon receiving the inquiry, the sensor 100 obtains image identification information such as the serial number of the sensor 100, patient information, and imaging date/time from header information added to the untransmitted image, and transmits the obtained identification information to the PC 110. The sensor registration unit 114 transfers the received identification information to the imaging information management unit 113, and the imaging information management unit 113 confirms whether there exists information of unreceived captured image data, which coincides with the received identification information. Note that sensor information used at the time of imaging has been registered in the imaging information management unit 113. Therefore, the imaging information management unit 113 holds sensor information including imaging information and the serial number of the sensor 100, which should have been linked with image data which has been captured but has not been received for some reason.

If information of unreceived captured image data exists in the imaging information management unit 113 (YES in step S404), the imaging information management unit 113 permits sensor registration, and thus the sensor registration unit 114 is notified of a sensor registration enable signal. The sensor registration unit 114 then starts registration processing of the sensor 100 (step S407).

On the other hand, if there is no unreceived image data whose identification information coincides with that of the untransmitted image (NO in step S404), the PC 110 cannot transmit the untransmitted image. Therefore, the sensor registration unit 114 prompts the user to select whether to perform the sensor registration processing by deleting the untransmitted image or interrupt the sensor registration processing while holding the untransmitted image (step S405).

If the user selects to continuously hold the untransmitted image (NO in step S405), the sensor registration unit 114 determines that sensor registration is impossible, and transmits a signal indicating a sensor registration failure to a state management unit 103 of the sensor 100 (step S410), thereby terminating communication. In this case, the sensor 100 is not registered in the PC 110. The sensor registration unit 114 notifies the user of a message indicating that the sensor 100 holds the untransmitted image and thus sensor registration is impossible, and also prompts the user to transmit the untransmitted image by connecting the sensor 100 to another control PC.

If the user selects to delete the untransmitted image (YES in step S405), the sensor registration unit 114 transmits an image deletion instruction to the sensor 100. When the sensor 100 receives the image deletion instruction, the state management unit 103 considers that the untransmitted image has been erased, and updates the state of the sensor 100 (step S406). Upon completion of updating the sensor state, the sensor 100 transmits, to the PC 110, a sensor registration enable signal indicating that preparation for sensor registration has been completed.

Upon receiving the sensor registration enable signal, the PC 110 returns, to the sensor 100, a confirmation signal indicating that the sensor registration unit 114 is to start the sensor registration processing, thereby starting the sensor registration processing (step S407). The sensor registration processing is performed, as in the first embodiment. Upon completion of sensor registration (YES in step S408), the user is notified of completion of sensor registration (step S409). After the sensor 100 is registered in this way, it is possible to transmit the untransmitted image in the sensor 100 to the PC 110 automatically or at an arbitrary timing selected by the user. As in the first embodiment, if sensor registration fails (NO in step S408), the user is notified of it (step S410).

As described above, according to the second embodiment, in addition to the above-described first embodiment, if the sensor holds an untransmitted image, it is confirmed whether the self apparatus (PC 110) is an appropriate transmission destination of the untransmitted image, and if the self apparatus is an appropriate transmission destination, it is controlled to perform sensor registration. This can provide an opportunity to appropriately transmit the untransmitted image in the sensor, thereby preventing in advance a loss of the untransmitted image or a recognition error.

Note that an example in which the serial number of the sensor, patient information, and imaging date/time are used as image identification information has been explained. However, the identification information need only be information capable of uniquely identifying image data and imaging information.

<Third Embodiment>

The third embodiment of the present invention will be described below. In the above-described second embodiment, an example in which whether the self apparatus (PC) is an appropriate transmission destination is determined based on the identification information of the untransmitted image in the sensor, and whether sensor registration is possible is determined in accordance with the result of the above determination processing has been explained. However, in the second embodiment, if the control PC in which sensor registration is to be performed is not the transfer destination of the untransmitted image, it is impossible to perform sensor registration to prevent a loss of the untransmitted image, and the sensor cannot be used for imaging. To cope with this, in the third embodiment, if the self apparatus (PC) is not an appropriate transfer destination of an untransmitted image, an appropriate transfer destination is searched for in a connected network. If an appropriate transfer destination is found in the network, the untransmitted image is transferred to the transfer destination, and then sensor registration in the self apparatus is performed.

Figure 4:
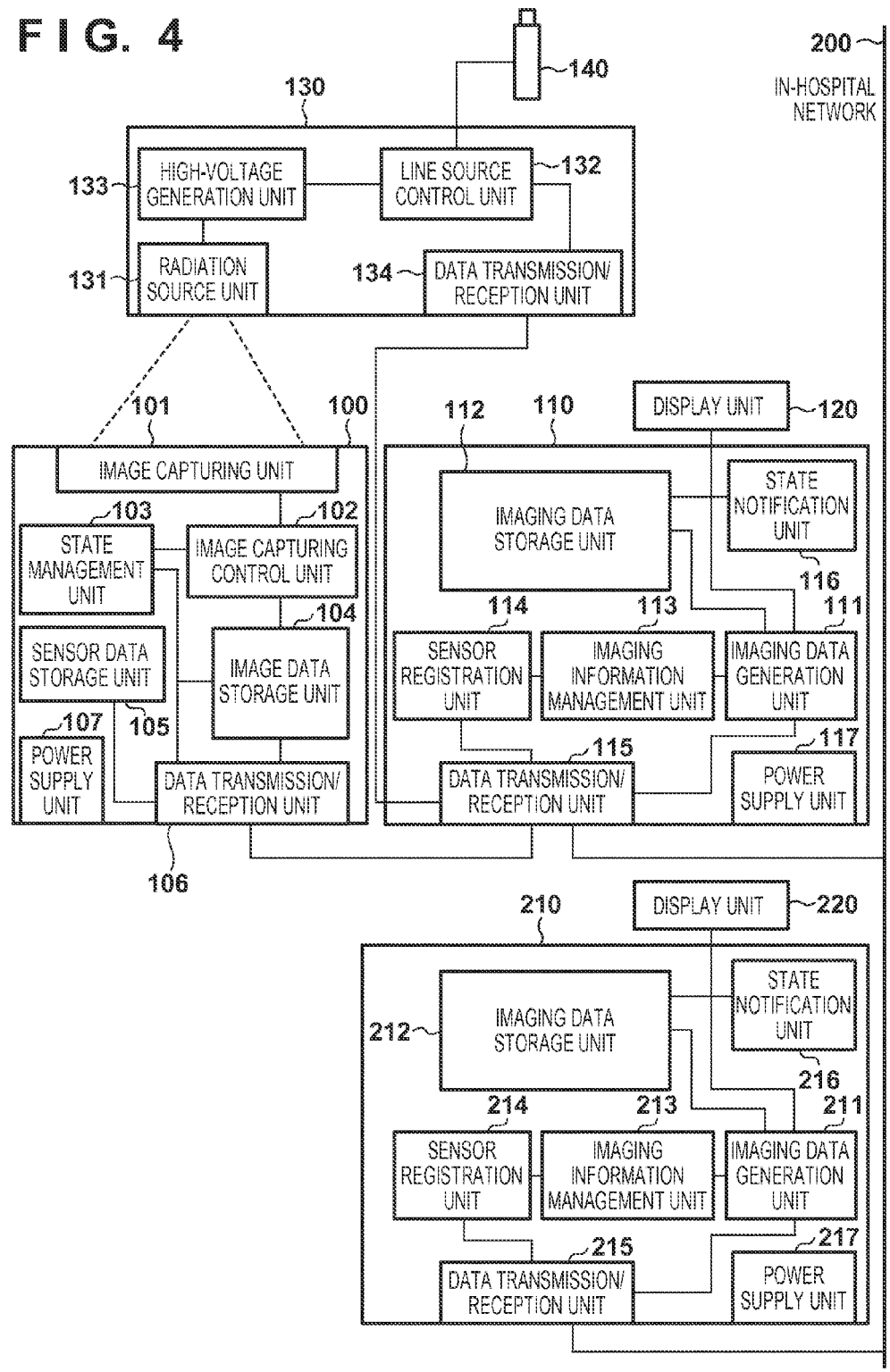
FIG. 4 is a block diagram showing a system configuration according to the third embodiment.
Figure 5A:
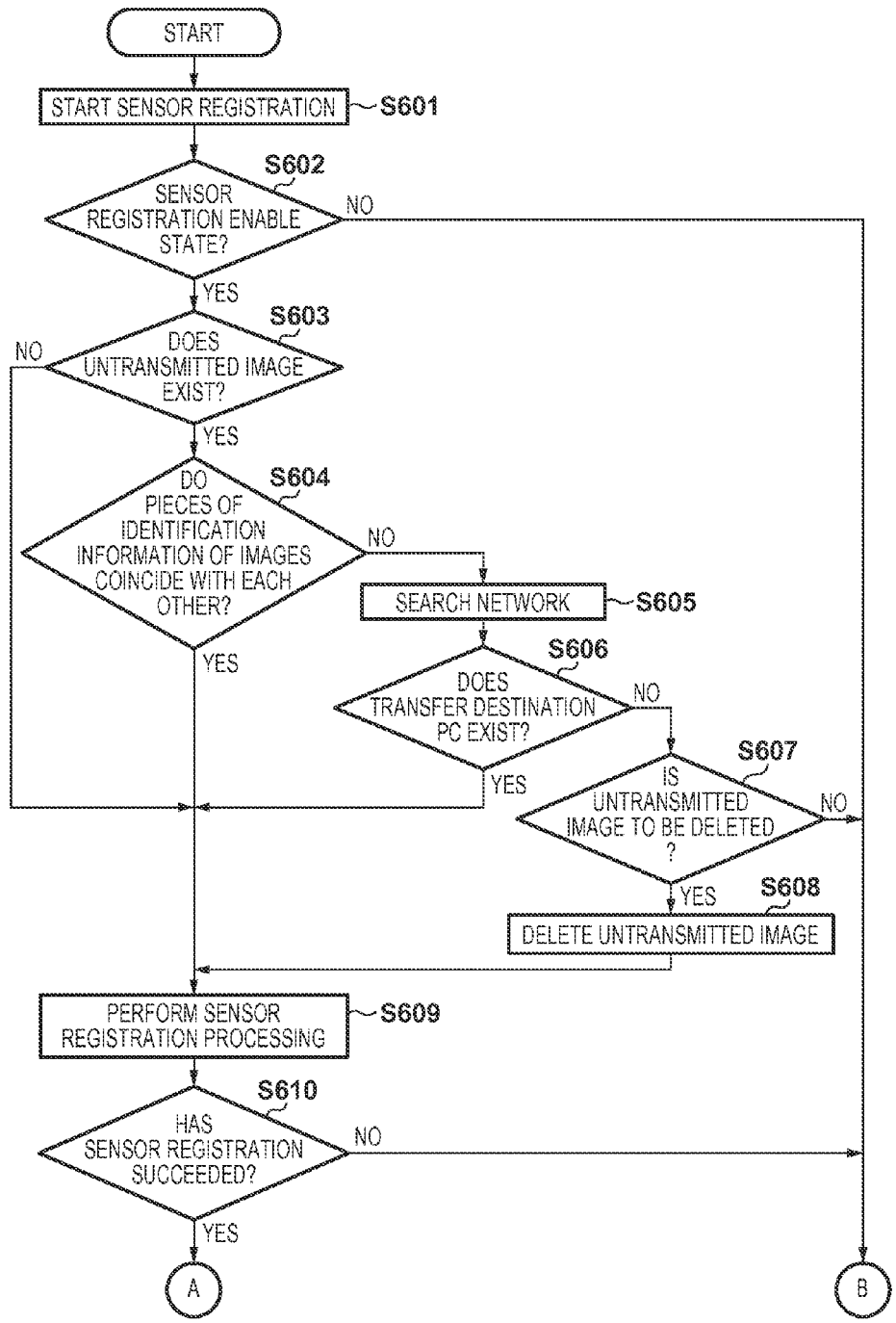
FIGS. 5A and 5B are flowcharts illustrating sensor registration processing according to the third embodiment.
Figure 5B:
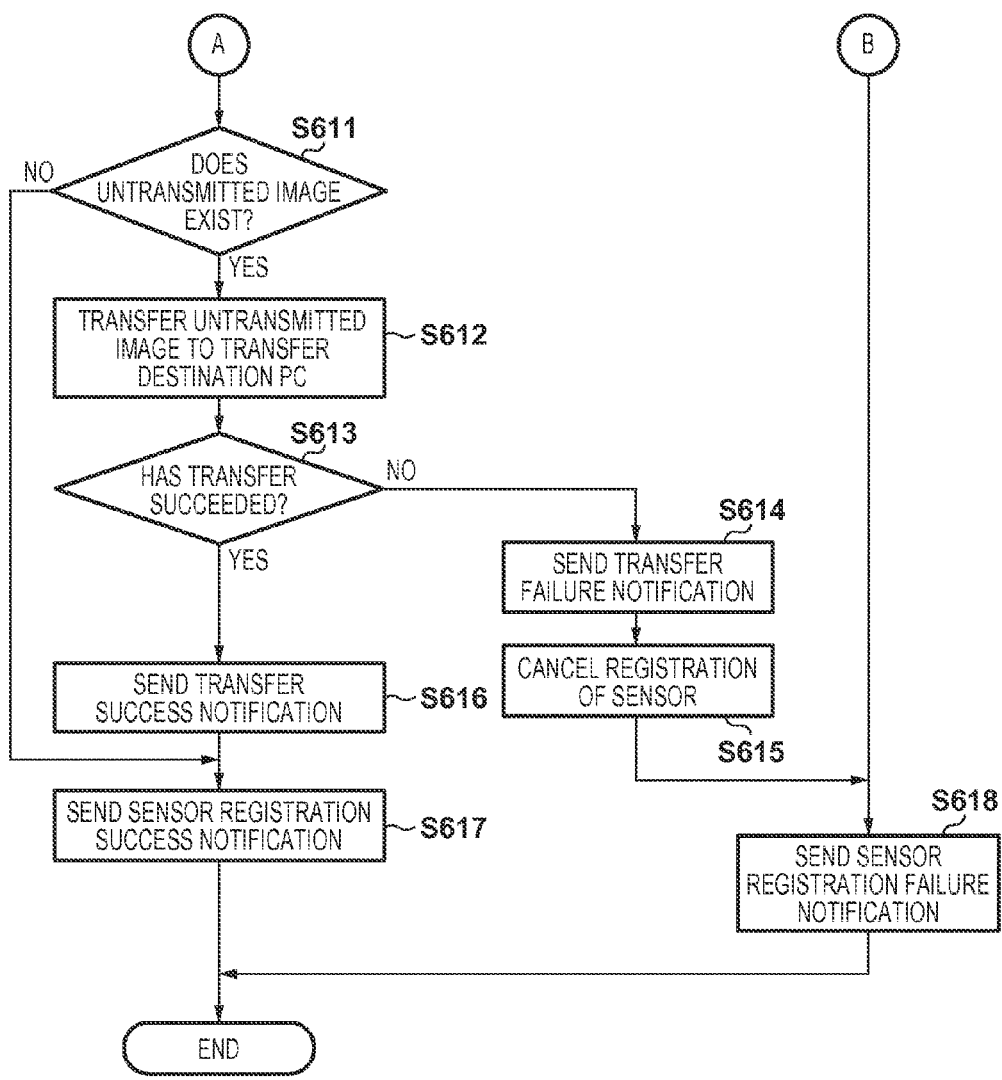

FIG. 4 is a block diagram showing the configuration of a radiation image obtaining processing system according to the third embodiment. FIGS. 5A and 5B are flowcharts illustrating sensor registration processing in a PC 110 according to the third embodiment. As shown in FIG. 4, in the third embodiment, the PC 110 according to the above-described first or second embodiment and another control PC 210 (to be referred to as a PC 210 hereinafter) with the same arrangement as that of the PC 110 are connected to an in-hospital network 200.

The sensor registration processing in the PC 110 according to the third embodiment will be described below with reference to FIGS. 5A and 5B.

As in the above-described second embodiment, after the state is changed to the sensor registration enable state (step S602) by using, as a trigger, a sensor registration start operation by the user (step S601), a sensor registration unit 114 determines whether a sensor 100 holds an untransmitted image (step S603). If the sensor 100 holds no untransmitted image, the sensor registration unit 114 performs the sensor registration processing (step S609).

On the other hand, if the sensor 100 holds an untransmitted image, whether the PC 110 holds information of an unreceived image corresponding to the untransmitted image is confirmed based on identification information of the untransmitted image (step S604), as in the second embodiment. If the identification information of the untransmitted image coincides with that of the unreceived image (YES in step S604), registration processing of the sensor 100 is performed (step S609), as in the second embodiment.

On the other hand, if the pieces of identification information do not coincide with each other (NO in step S604), the identification information of the untransmitted image is broadcast in the in-hospital network 200. Upon receiving the identification information, the PC 210 searches an imaging information management unit 213 of its own for imaging information coinciding with the identification information (step S605). If the coincident imaging information exists, the transmission source (PC 110) is notified that the self apparatus (PC 210) is the transfer destination of the untransmitted image (YES in step S606).

Upon receiving, from the PC 210, a response indicating that the PC 210 is the transfer destination, the PC 110 temporarily holds communication information such as the IP address and subnet mask of the PC 210, and performs the sensor registration processing first (step S609). That is, an imaging information management unit 113 notifies the sensor registration unit 114 of a sensor registration enable signal, and the sensor registration unit 114 starts the registration processing of the sensor 100.

If sensor registration succeeds (YES in step S610), it is confirmed whether the sensor 100 holds an untransmitted image. If the sensor 100 holds an untransmitted image (YES in step S611), the transfer processing of the untransmitted image is performed (step S612). This transfer processing is performed in two stages. First, the untransmitted image in the sensor 100 is transmitted to a data transmission/reception unit 115 of the PC 110 as a sensor registration target, and then transferred from the PC 110 to a data transmission/reception unit 215 of the PC 210 as a transfer target. In this transfer processing, the communication information temporarily held in step S609 is used. If the PC 210 receives the untransmitted image, the image data is transferred to an imaging data generation unit 211, and is linked with the imaging information, thereby generating final imaging data, as in the second embodiment. Upon completion of generation of the imaging data (YES in step S613), the PC 210 notifies the PC 110 that the transfer processing has succeeded, and also notifies the sensor 100 of completion of the transfer processing (step S616). The PC 110 transmits a sensor registration completion signal and a transfer processing completion signal to a state notification unit 116, and notifies the user of completion of the processing (step S617).

On the other hand, if the PC 210 as a transfer target cannot generate appropriate imaging data based on the transferred untransmitted image (NO in step S613), the PC 210 notifies the PC 110 of a failure of generation of imaging data, that is, that the transfer processing of the untransmitted image has failed. The PC 110 notifies the sensor 100 of interruption of the transfer processing (step S614). Note that when the transfer processing is interrupted, the untransmitted image returns to a state before the transfer processing in an image data storage unit 104 of the sensor 100. If the PC 110 receives the transfer failure notification, the sensor registration unit 114 determines that sensor registration is impossible, and cancels registration of the sensor 100 already registered in step S609 (step S615). A signal indicating a sensor registration failure is transmitted to a state management unit 103 of the sensor 100 (step S618), thereby terminating communication.

Note that if no untransmitted image is held in the sensor 100 when sensor registration succeeds (NO in step S611), the process directly advances to step S617 to notify the user of the success of sensor registration.

On the other hand, if no transfer destination PC is found in the in-hospital network 200 (NO in step S606), the user selects whether to perform sensor registration by erasing the untransmitted image or interrupt sensor registration while holding the untransmitted image (step S607), as in the first embodiment. If the user selects the latter operation, the sensor is notified of the sensor registration failure (step S618). If the user selects the former operation, after the untransmitted image is deleted (step S608), the sensor registration processing starts (step S609).

Note that the user may preset a time-out time for a network search, and if no control PC sends a notification that it is a transfer destination within the time-out time, it may be determined that there is no appropriate transfer destination in the network.

Note that FIGS. 5A and 5B show an example in which if the PC 210 to which the untransmitted image in the sensor 100 is to be transferred is detected in the in-hospital network 200, the sensor registration processing in the PC 110 is performed and then the untransmitted image is transferred to the PC 210. This processing order may be reversed. That is, after transferring the untransmitted image via the network, sensor registration may be performed in the PC 110.

As described above, according to the third embodiment, in addition to the above-described second embodiment, it is confirmed whether the sensor holds an untransmitted image captured by another control PC in the network. If an untransmitted image captured by another control PC is held, a control PC as a transfer destination is searched for in the network, and processing of transferring the untransmitted image to the control PC is performed at the time of sensor registration. This can automatically transfer the untransmitted image in the sensor to an appropriate transfer destination, and the user can smoothly start imaging using the sensor.

<Fourth Embodiment>

The fourth embodiment of the present invention will be described below. In the above-described third embodiment, it is possible to prevent a loss of an untransmitted image and the unusable state of the sensor by searching the network for an appropriate transfer destination. However, if no appropriate transfer destination is found in the network, it is impossible to perform imaging using the sensor. To cope with this, in the fourth embodiment, if no appropriate transfer destination is found in a network, an untransmitted image is transferred to a control PC as a sensor registration target, and temporarily saved. By performing sensor registration processing in this state, the user can perform imaging using the sensor. After that, the network is searched at the time of activation of a system, and it is confirmed whether an appropriate transfer destination of the untransmitted image exists in the network. If an appropriate transfer destination exists, the system can start to use after performing transfer processing.

Figure 6A:
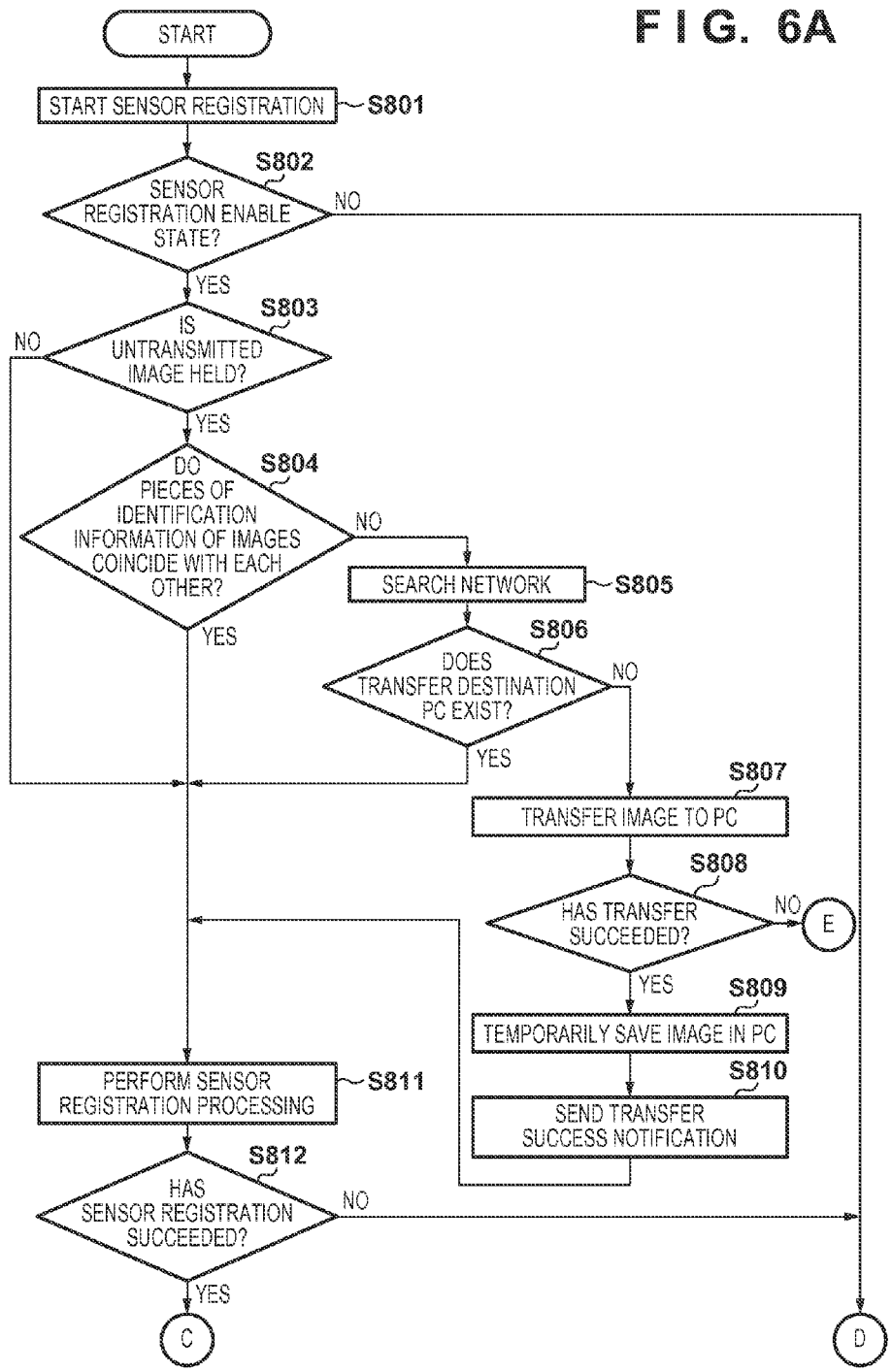
FIGS. 6A and 6B are flowcharts illustrating sensor registration processing according to the fourth embodiment.
Figure 6B:
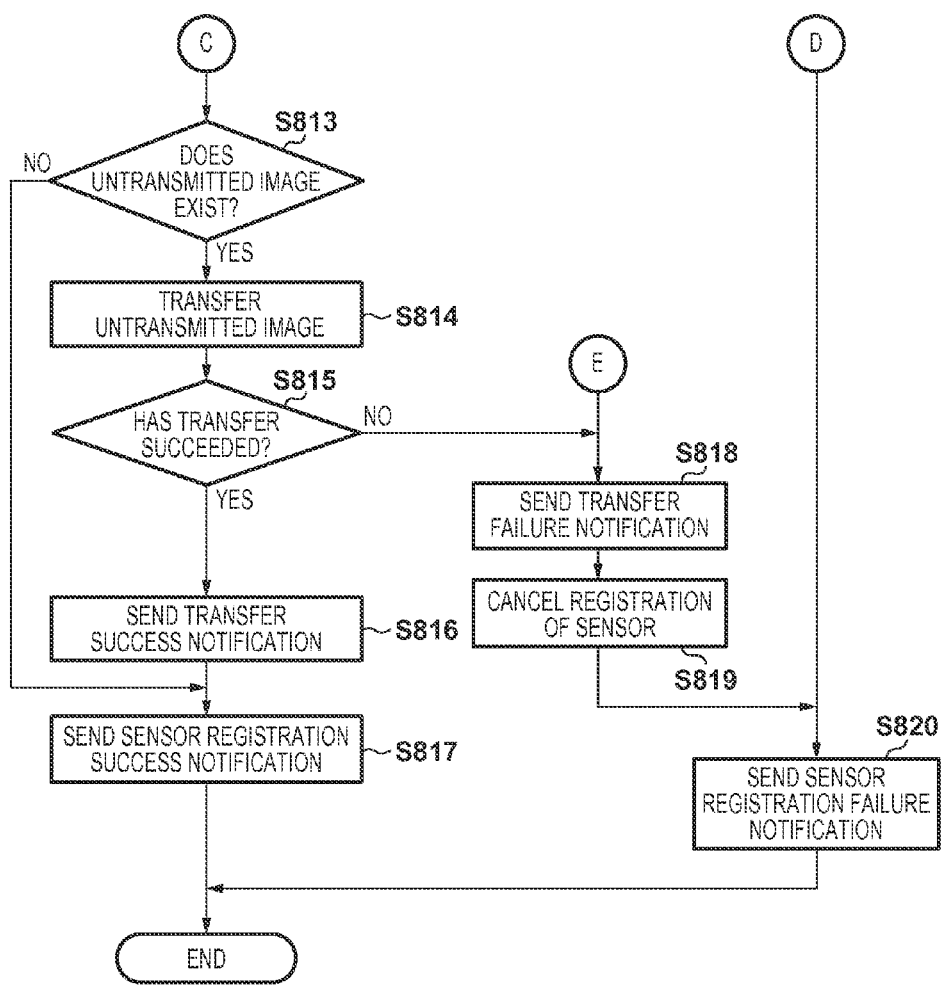

The configuration of a radiation image obtaining processing system according to the fourth embodiment is the same as that shown in FIG. 4 described in the third embodiment. FIGS. 6A and 6B are flowcharts illustrating sensor registration processing in a PC 110 according the fourth embodiment. As in the third embodiment, after the state is changed to the sensor registration enable state (step S802) by a sensor registration start operation by the user (step S801), a sensor registration unit 114 determines whether a sensor 100 holds an untransmitted image (step S803). If the sensor 100 holds no untransmitted image, the sensor registration unit 114 performs the sensor registration processing (step S811).

On the other hand, if the sensor 100 holds an untransmitted image, whether the PC 110 holds information of an unreceived image corresponding to the untransmitted image is confirmed based on identification information of the untransmitted image (step S804), as in the third embodiment. If the identification information of the untransmitted image coincides with that of the unreceived image (YES in step S804), registration processing of the sensor 100 is performed (step S811), as in the third embodiment.

On the other hand, if the pieces of identification information do not coincide with each other (NO in step S804), the identification information of the untransmitted image is broadcast in an in-hospital network 200. Upon receiving the identification information, a PC 210 searches an imaging information management unit 213 of its own for imaging information coinciding with the identification information (step S805). If the coincident imaging information exists, the transmission source (PC 110) is notified that the self apparatus (PC 210) is the transfer destination of the untransmitted image (YES in step S806).

Upon receiving, from the PC 210, a response indicating that the PC 210 is the transfer destination, the PC 110 temporarily holds communication information such as the IP address and subnet mask of the PC 210, and performs the sensor registration processing first (step S811), as in the third embodiment. Note that processes (steps S812 to S820) after sensor registration are the same as in the third embodiment (steps S610 to S618) and a description thereof will be omitted.

If no control PC in the in-hospital network 200 returns a response indicating that the PC is a transfer destination even when a predetermined time elapses after broadcasting the identification information, it is determined that there is no appropriate transfer destination of the untransmitted image in the network (NO in step S806). In this case, processing of temporarily transferring the untransmitted image to the PC 110 as a sensor registration target is performed (step S807).

If the PC 110 successfully receives the untransmitted image (YES in step S808), it notifies the sensor 100 that transfer has succeeded, and temporarily saves the untransmitted image in an imaging data storage unit 112 (step S809). At this time, an imaging data generation unit 111 of the PC 110 has no imaging information to be linked with the received untransmitted image, and thus the untransmitted image is saved in the imaging data storage unit 112 intact. A message to notify the user that the untransmitted image held in the sensor 100 has been temporarily transferred to the PC 110 is displayed on a display unit 120 or the like (step S810). After that, the process advances to sensor registration processing (step S811). This makes it possible to perform imaging using the sensor 100 in the fourth embodiment.

Note that if temporal transfer of the untransmitted image to the PC 110 fails for some reason (NO in step S808), the user is notified of the transfer failure, similarly to transfer determination processing in step S814 (step S818). When performing the determination processing, no sensor registration has been performed, and thus sensor registration cancellation processing (step S819) is skipped.

As described above, in the fourth embodiment, the untransmitted image is temporarily saved in the PC 110 in step S809. After that, every time the PC 110 activates the system, an imaging information management unit 113 searches for imaging data in the imaging data storage unit 112, and confirms whether there is data which is not linked with imaging information. If there is data which is not linked with imaging information, identification information of the data is broadcast in the in-hospital network 200 to which the self apparatus is connected, and whether there is a transfer destination having appropriate imaging information is confirmed. If an appropriate transfer destination is found, transfer processing of the untransmitted image is performed to generate imaging data, as in the third embodiment.

Note that it is desirable to confirm the search processing in the imaging information management unit 113 every time the system is activated, but the user can set a confirmation timing and frequency. It is also possible to execute the processing by an arbitrary operation by the user instead of automatically executing the processing. If there is image data which is not linked with imaging information, the data can be deleted with the consent of the user.

As described above, according to the fourth embodiment, even if there is an untransmitted image at the time of sensor registration and no appropriate transfer destination of the untransmitted image is found in the network, the image is temporarily saved in a control PC as a sensor registration target. By searching for an appropriate transfer destination again to perform the transfer processing of the untransmitted image, it becomes possible to perform imaging using the sensor while preventing an image loss.

<Fifth Embodiment>

The fifth embodiment of the present invention will be described below. In the above-described first to fourth embodiments, an example in which whether sensor registration is possible is determined at the time of sensor registration has been explained. However, for example, if the sensor is already registered in the control PC, no sensor registration processing is performed and the untransmitted image may be inappropriately transferred. To cope with this, in the fifth embodiment, prior to sensor registration processing, when communication between a sensor and a control PC starts (or restarts), for example, when the sensor is connected to the control PC, whether communication is possible is determined based on the existence of an untransmitted image.

The configuration of a radiation image obtaining processing system according to the fifth embodiment is the same as that in each of the above-described embodiments but a sensor registration unit 114 of a PC 110 also determines whether communication is possible.

Figure 7:
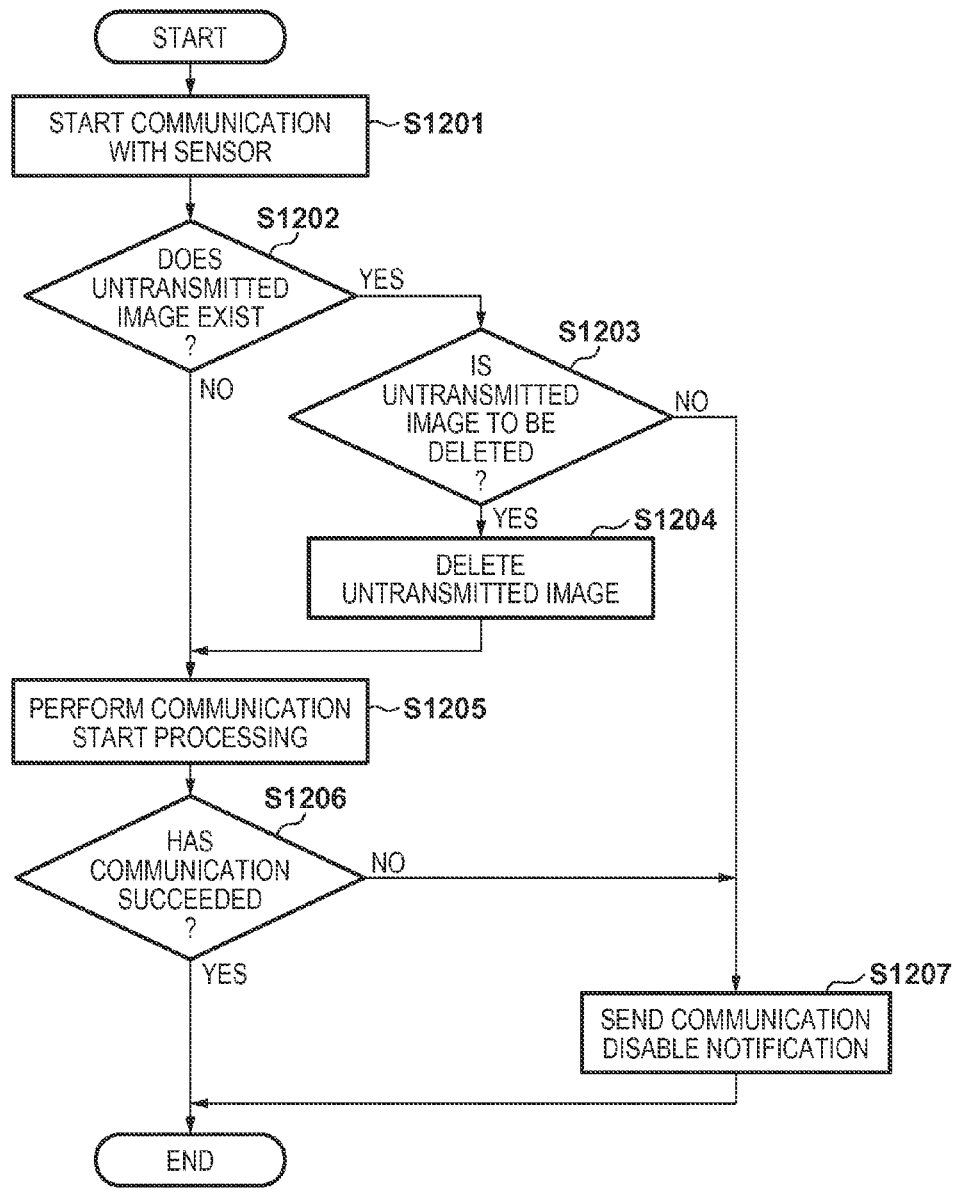
FIG. 7 is a flowchart illustrating sensor registration processing according to the fifth embodiment.

FIG. 7 is a flowchart illustrating sensor communication start processing in the PC 110 according to the fifth embodiment. When communication with a sensor 100 starts (step S1201), the sensor registration unit 114 of the PC 110 receives information about the presence/absence of an untransmitted image from a state management unit 103 of the sensor 100 (step S1202). At this time, if a signal indicating the presence of an untransmitted image is received (YES in step S1202), the user is prompted to select whether to interrupt communication or perform communication by deleting the untransmitted image (step S1203). If the user selects the former operation (NO in step S1203), for example, a message to notify that communication is impossible due to the presence of the untransmitted image is displayed (step S1207), thereby terminating the processing. If the user selects the latter operation (YES in step S1203), the untransmitted image is deleted (step S1204), and then communication starts (step S1205).

Note that if there is no untransmitted image in the sensor 100 (NO in step S1202), it is determined that the sensor 100 is usable, and communication starts (step S1205). If communication fails (NO in step S1206), a notification that communication is impossible is sent (step S1207).

As in the second embodiment, at start of communication, whether an untransmitted image can be transferred can be determined based on identification information of the untransmitted image, thereby determining whether to permit the use of the sensor. The state management unit 103 of the sensor 100 can also determine whether to permit the use of the sensor.

As described above, according to the fifth embodiment, by determining whether to permit the use of the sensor not only at the time of sensor registration but also at start of communication with the sensor, it is possible to further reduce the risk of losing an untransmitted image.

<Sixth Embodiment>

The sixth embodiment of the present invention will be described below. The sixth embodiment assumes a system in which a plurality of control PCs are connected in an in-hospital network, as in the third embodiment. If an untransmitted image is saved in a sensor, connection to control PCs other than that which saves an imaging order corresponding to the untransmitted image is saved or which can obtain the imaging order, among the plurality of control PCs connected to a network, is limited.

FIG. 8 is a block diagram showing the configuration of a radiation image obtaining processing system according to the sixth embodiment. As shown in FIG. 8, in the system according to the sixth embodiment, PCs 110 and 210 are connected to an in-hospital network 200, similarly to FIG. 4 of the third embodiment. Referring to FIG. 8, an RIS (Radiology Information System) 801 is connected to the in-hospital network 200. Furthermore, a PACC (Picture Archiving and Communication System) 802 is connected. Each of the RIS 801 and PACC 802 is a server apparatus including a database and a controller for the database or a server apparatus group. The RIS 801 integrally manages the imaging order of imaging executed by each radiation image obtaining processing system (medical imaging modality). The PACC 802 records an image captured by the medical imaging modality, and outputs the image, as needed.

Sensor registration processing of registering a sensor 100 which may have an image that has not been transmitted to the PC 110 according to the sixth embodiment will be described with reference to a flowchart shown in FIGS. 9A and 9B. A case in which the sixth embodiment is applied to the sensor registration processing according to the above-described second embodiment will be exemplified. However, the sixth embodiment is also applicable to other embodiments, as a matter of course.

For example, as in the second embodiment, after the state is changed to the sensor registration enable state (step S902) by a sensor registration start operation by the user (step S901), a sensor registration unit 114 determines whether the sensor 100 holds an untransmitted image (step S903). If the sensor 100 holds no untransmitted image, the sensor registration unit 114 performs the sensor registration processing (step S911).

On the other hand, if the sensor 100 holds an untransmitted image, whether the untransmitted image is an image for which an imaging instruction has been issued in the PC 110 is determined depending on whether an imaging order corresponding to the untransmitted image exists in the PC 110 (step S904). For example, the sensor 100 transmits identification information of the untransmitted image to the PC 110. The sensor registration unit 114 of the PC 110 receives the identification information, and searches for an imaging order stored in an imaging information management unit 113. Note that the imaging order may be stored in another component of the PC 110. If it is determined that the imaging order exists (YES in step S904), the sensor registration processing (step S911) is performed, as in the second embodiment.

On the other hand, if it is determined that no imaging order exists in the PC 110 (NO in step S904), this means that the imaging order has been deleted from the imaging information management unit 113 or imaging corresponding to the untransmitted image has been performed by another control PC (PC 210). If the imaging order corresponding to the untransmitted image has been deleted from the imaging information management unit 113, it is considered that the imaging order is stored in the RIS 801 while it is incomplete. The PC 110 determines whether an imaging order corresponding to the identification information exists in the RIS 801 (step S905). That is, the PC 110 transmits, to the RIS 801, a request signal to inquire whether the imaging order exists, and receives a response signal to the request signal. This response signal includes information indicating whether the imaging order exists.

If the imaging order does not exist in the RIS 801 (NO in step S905), the sensor registration unit 114 determines that sensor registration is impossible, and transmits a signal indicating a sensor registration failure to the state management unit 103 of the sensor 100 (step S914), thereby terminating communication.

On the other hand, if the imaging order exists in the RIS 801 (YES in step S905), the status of the imaging order is confirmed. If the status of the imaging order indicates that the imaging order has been started and is incomplete (YES in step S906), the PC 110 cancels the started status of the imaging order, notifies again that the imaging order has been started, and receives the imaging order form the RIS 801 (step S907). This is done because the imaging order in the started status on the RIS 801 has been started by another control PC different from the PC 110.

If imaging order reception processing is performed in step S907, double exposure may occur depending on a situation. Therefore, a dialog is displayed to notify the user of information indicating that the status of the imaging order started by another control PC may be overwritten. In response to pressing of a button for accepting an approval input from the user in the dialog, the status is changed and the imaging order is received. At this time, information indicating a situation or reason for using the function may be selected from a list. Examples of the information indicating a situation or reason are "it is necessary to execute the imaging order again by another control PC due to a failure of a control PC" and "a control PC which is executing the imaging order is in use for another imaging and it is necessary to additionally perform imaging by another medical imaging modality".

It is considered to periodically perform communication between a plurality of control PCs in the system to confirm the state of one another. Each PC periodically transmits state information to another PC via the in-hospital network 200. In addition, upon activation of software in the PC and at the end of execution of the software, state information is transmitted.

If the PC 110 can obtain the imaging order from the RIS 801 in step S907, the imaging order and the untransmitted image are associated with each other (step S908). That is, the received imaging order is held in the imaging information management unit 113, and at least one of the imaging order and the untransmitted image includes identification information of one another, thereby allowing the imaging order or untransmitted image to specify the information of one another. This enables the sensor registration processing (step S911) to be performed, as in the second embodiment.

On the other hand, if the status of the imaging order existing in the RIS 801 indicates "complete" or "executed" (NO in step S906), an image corresponding to the imaging order has been transferred to the PACC 802 at high probability. However, it can be theoretically assumed that transfer to the PACC 802 may have failed or transmission from the sensor 100 to the PC 110 may be incomplete. To cope with this, in the sixth embodiment, while registration processing (step S911) of the sensor 100 is permitted in either case, the first setting of permitting transmission of the untransmitted image from the sensor 100 to the PC 110 and the second setting of deleting the untransmitted image without transmitting it are set to be selectable. More specifically, setting information as a Boolean parameter which takes one of 0 indicating the first setting and 1 indicating the second setting is stored in a memory (not shown) of the sensor registration unit 114. The setting information can be changed by a user operation input, and a GUI for allowing the user operation input is displayed on a display unit 120 under the control of the PC 110. Therefore, whether to delete the untransmitted image from the sensor 100 is determined in accordance with the setting information (step S909). If the second setting has been made (YES in step S909), the untransmitted image is deleted (step S910), and the sensor registration processing is performed (step S911).

If the RIS 801 limits transmission of the imaging order, which has been started once, to a control PC (medical imaging modality) other than that which has sent a notification of the start of the imaging order, the above-described processing is not performed. In this case, it is impossible to associate the imaging order with the image until the control PC which has sent the notification of the start of the imaging order recovers.

In the sixth embodiment, whether to perform the above processing is determined in accordance with the function of the RIS 801. To do this, the PC 110 can store information indicating the function of the RIS 801. For example, RIS function information as a Boolean parameter which takes 1 if the RIS 801 can transmit the imaging order to a medical imaging modality other than that which has triggered the start of started inspection, and takes 0 if the RIS 801 cannot transmit the imaging order is stored in the memory of the PC 110. The RIS function information may be generated in the PC 110 in accordance with the notification from the RIS 801, or the RIS function information itself may be received from the RIS 801. Alternatively, the PC 110 may display a GUI for setting the RIS function information, and the RIS function information set by an operation input from an operation unit may be stored in the memory.

By referring to the RIS function information stored in the memory, the PC 110 determines whether the RIS 801 connected to the PC 110 can transmit the imaging order to a medical imaging modality other than that which has triggered the start of started inspection. If it is determined that the RIS 801 can transmit the imaging order, whether to permit registration of the sensor 100 is controlled depending on whether the imaging order can be obtained as described above.

On the other hand, if it is determined that the RIS 801 cannot transmit the imaging order, registration of the sensor 100 is permitted in accordance with conditions. This is done to reduce a situation in which the untransmitted image stored in the sensor 100 cannot be extracted by any PC. For example, registration is permitted in response to a special operation input. Examples of the special operation input are pressing of a button corresponding to the special input and an input to designate an operator and reason. For example, if the sensor 100 can hold a plurality of untransmitted images and the number of untransmitted images does not exceeds a holding permitted number, even when image transmission fails, this leads to an image loss at low probability, thereby allowing imaging. In this case, in response to the above-described special operation input, connection to a control PC (PC 110) which does not hold the imaging order of the untransmitted image and cannot obtain the imaging order is exceptionally permitted.

As for normal sensor registration processing, in addition to or instead of connecting the sensor 100 and the PC 110 electrically or via a cable, the user operates the switch of the sensor, thereby starting registration. The above-described special operation input is performed in addition to or instead of an operation performed in the normal sensor registration processing.

Alternatively, registration of the sensor 100 may be permitted if the user has logged in to a different control PC with the same user ID, and registration of the sensor 100 may be limited if the user ID is different.

Figure 9A:
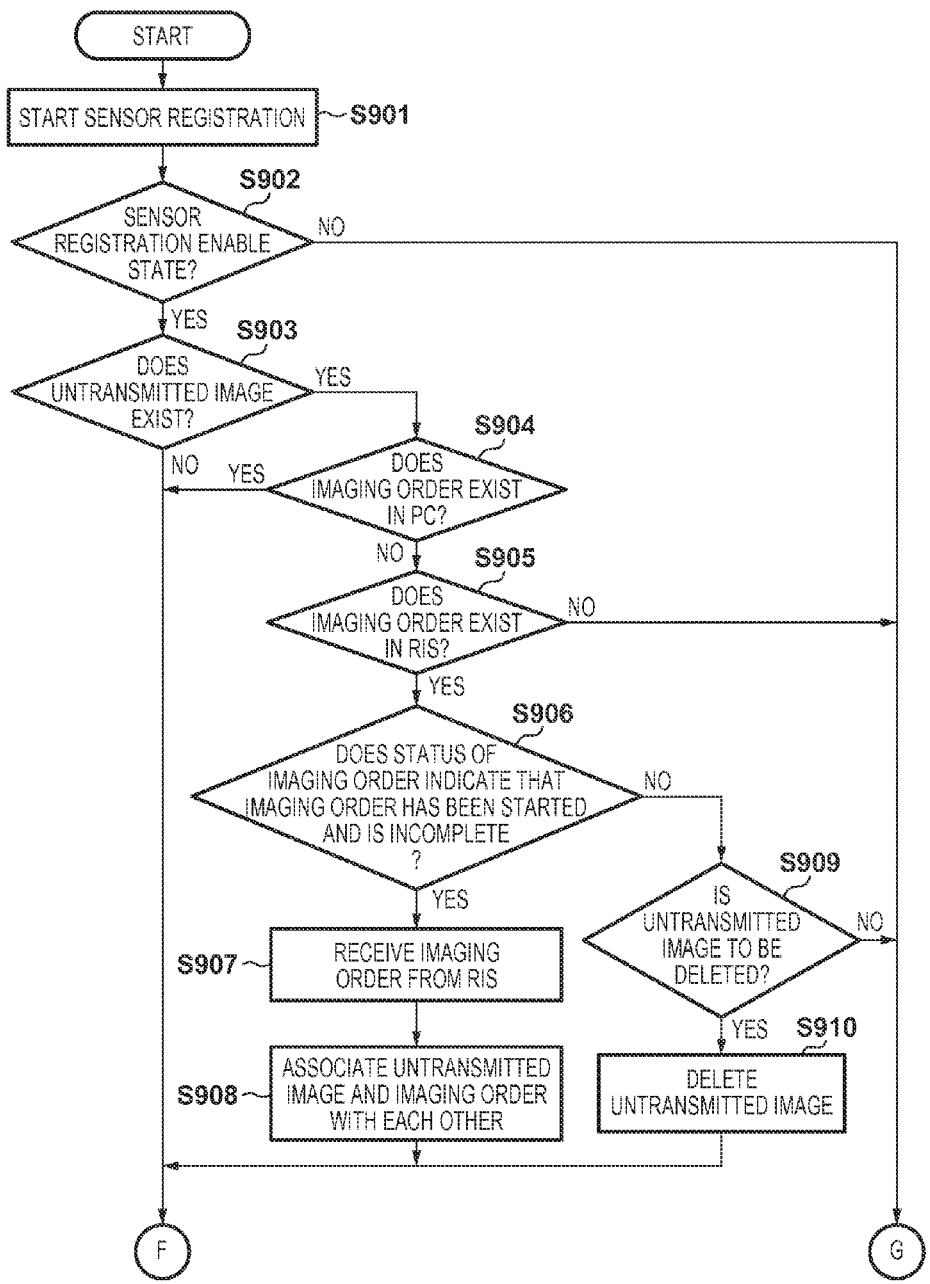
FIGS. 9A and 9B are flowcharts illustrating sensor registration processing according to the sixth embodiment.
Figure 9B:
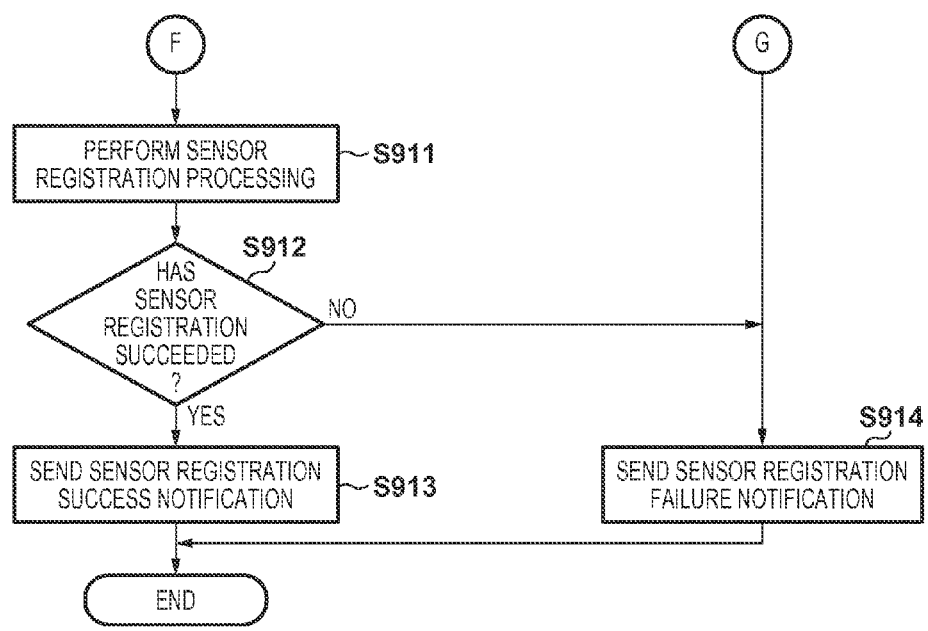

If there are a plurality of untransmitted images, the existence of an imaging order is determined as shown in FIGS. 9A and 9B for each of the images. If it is determined that the imaging orders corresponding to all the untransmitted images are stored in the PC 110 or can be obtained from the RIS 801, it is possible to register the sensor 100.

As described above, according to the sixth embodiment, when the sensor holds an untransmitted image, whether to permit the use of the sensor is controlled based on whether the control PC can hold the image order of the untransmitted image. That is, the sensor is permitted to be connected to a control PC which holds the imaging order of the untransmitted image or can obtain the imaging order, and connection to other control PCs is limited. This makes it easy to associate the untransmitted image in the sensor with the imaging order.

The sensor registration processing described in each of the above-described first to sixth embodiments is effective when the sensor has a function of holding an untransmitted image. When, therefore, registering a sensor having no function of saving an untransmitted image, the above-described sensor registration processing is skipped. Whether to skip the processing is determined with reference to the function information of the sensor. For example, function information as an integer parameter which takes a value N indicating the maximum holding possible number when the sensor has the function of saving an untransmitted image and takes a value of 0 when the sensor has no function of saving an untransmitted image is stored in the sensor. When the sensor transmits the function information to the control PC at the time of sensor registration, the control PC can determine the presence/absence of the sensor function of saving an untransmitted image.

If the sensor has the function of saving an untransmitted image, the above-described sensor registration processing is performed; otherwise, the above-described sensor registration processing is skipped. Note that a sensor supporting only wired connection can be used as a sensor having no function of saving an untransmitted image.

The second or subsequent registration processing, for example, a case in which after the sensor 100 is registered in the PC 110 once, it is registered in another control PC and connected to the PC 110 again will be considered. In this case, at the time of the first registration processing in the PC 110, the function information of the sensor 100 is stored in correspondence with obtained ID information of the sensor 100. This can eliminate the reception processing of the function information at the time of the second or subsequent registration processing of the sensor 100 in the PC 110, thereby shortening the time taken to perform the sensor registration processing.

In the above-described embodiments, registration processing of registering the sensor in the control PC has been explained. However, in another embodiment, even when a control PC is registered in a sensor, whether to permit the use of the sensor is controlled, as described above. That is, when associating the sensor and the control PC with each other, whether to permit the use of the sensor is controlled based on whether the sensor holds an untransmitted image.

According to the present invention, if the sensor holds an untransmitted captured image data, it is possible to prevent the captured image data from being erroneously transmitted to an inappropriate controller.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-211991, filed Oct. 16, 2014, which is hereby incorporated by reference herein in its entirety.

What is claimed is:

1. An imaging system for capturing an image by detecting radiation from a radiation generating apparatus and converting radiation into an electric signal, by a sensor, and transmitting image data of the image captured by the sensor to a controller, wherein the controller displays, on a display unit, a message including the number of untransmitted images based on untransmitted image data which the sensor holds, based on whether the sensor already holds the captured image data at the time of connection of the sensor, the sensor includes a storage unit comprising a semiconductor storage device configured to hold the image data of the captured image, and a transmission unit configured to transmit the image data held in the storage unit to the controller, the controller includes a control unit configured to control whether to permit the use of the sensor, a reception unit configured to receive the image data transmitted by the transmission unit, and a generation unit configured to generate imaging data by adding imaging information to the received image data, and the control unit controls whether to permit the use of the sensor, in accordance with the presence/absence of untransmitted image data in the storage unit, such that if the untransmitted image data exists in the storage unit, the control unit disables the use of the sensor.

2. The system according to claim 1, wherein if the untransmitted image data is captured while the sensor is connected to the controller, the control unit permits the use of the sensor.

3. The system according to claim 2, wherein the sensor includes an addition unit configured to add the imaging information to the image data, the controller includes a management unit configured to manage the imaging information, and if the imaging information added to the untransmitted image data is managed by the management unit, the control unit permits the use of the sensor.

4. The system according to claim 3, wherein the imaging information includes identification information of the sensor.

5. The system according to claim 1, wherein the controller is connected to another controller via a network, and if the untransmitted image data has been captured while the sensor is connected to the other controller, the control unit transfers the untransmitted image data to the other controller, and permits the use of the sensor.

6. The system according to claim 5, wherein the sensor includes an addition unit configured to add the imaging information to the image data, the other controller includes a management unit configured to manage the imaging information, and the control unit broadcasts the imaging information added to the untransmitted image data to the network, and if a response is sent from a controller configured to manage imaging information coinciding with the imaging information, transfers the untransmitted image data to the controller which has responded.

7. The system according to claim 1, wherein the controller includes a storage unit configured to store the imaging data generated by the generation unit, and the control unit temporarily saves the untransmitted image data in the storage unit, and permits the use of the sensor.

8. The system according to claim 1, wherein the controller includes a holding unit configured to hold an imaging order, and if an imaging order corresponding to the untransmitted image data is held in the holding unit or the imaging order can be obtained from an external apparatus, the control unit permits the use of the sensor.

9. The system according to claim 1, wherein the controller includes a notification unit configured to notify a user of whether to permit the use of the sensor.

10. An imaging system for capturing an image by detecting radiation from a radiation generating apparatus and converting radiation into an electric signal, by a sensor, and transmitting image data of the image captured by the sensor to a controller, wherein the controller displays, on a display unit, a message including the number of untransmitted images based on untransmitted image data which the sensor holds, based on whether the sensor already holds the captured image data at the time of connection of the sensor, the sensor includes a storage unit comprising a semiconductor storage device configured to hold the image data of the captured image, and a transmission unit configured to transmit the image data held in the storage unit to the controller, the controller includes a control unit configured to control whether to permit the use of the sensor in accordance with the presence/absence of untransmitted image data in the storage unit, a reception unit configured to receive the image data transmitted by the transmission unit, and a generation unit configured to generate imaging data by adding imaging information to the received image data, and the controller includes an input unit configured to input a user instruction indicating whether to delete the untransmitted image data when the untransmitted image data exists, such that when a user instruction indicating deletion of the untransmitted image data is input, the control unit requests the sensor to delete the untransmitted image data and permits the use of the sensor after receiving a response indicating that the untransmitted image data has been deleted from the sensor.

11. An imaging system for capturing an image by detecting radiation from a radiation generating apparatus and converting radiation into an electric signal, by a sensor, and transmitting image data of the image captured by the sensor to a controller, wherein the controller displays, on a display unit, a message including the number of untransmitted images based on untransmitted image data which the sensor holds, based on whether the sensor already holds the captured image data at the time of connection of the sensor, the sensor includes a storage unit comprising a semiconductor storage device configured to hold the image data of the captured image, and a transmission unit configured to transmit the image data held in the storage unit to the controller, the controller includes a control unit configured to control whether to permit the use of the sensor in accordance with the presence/absence of untransmitted image data in the storage unit, a reception unit configured to receive the image data transmitted by the transmission unit, a generation unit configured to generate imaging data, and a registration unit configured to register information of the sensor, the generation unit adds the imaging information and the information of the sensor to the received image data to generate the imaging data, and if the untransmitted image data exists in the storage unit at start of registration by the registration unit, the control unit disables the information of the sensor from being registered by the registration unit.

12. An imaging control apparatus for receiving image data of an image captured by detecting radiation from a radiation generating apparatus and converting radiation into an electric signal by a sensor, comprising:

a controller configured to display, on a display unit, a message including the number of untransmitted images based on untransmitted image data which the sensor holds, based on whether the sensor already holds the captured image data at the time of connection of the sensor, the sensor comprising a storage unit comprising a semiconductor storage device configured to hold the image data of the captured image, and a transmission unit configured to transmit the image data held in the storage unit to the controller, the controller comprising a control unit configured to control whether to permit the use of the sensor, a reception unit configured to receive the image data transmitted by the transmission unit, and a generation unit configured to generate imaging data by adding imaging information to the received image data, wherein the control unit controls whether to permit the use of the sensor, in accordance with the presence/absence of untransmitted image data in the storage unit, such that if the untransmitted image data exists in the storage unit, the control unit disables the use of the sensor.

13. A radiation detector for obtaining radiation image data by detecting radiation from a radiation generating apparatus and converting radiation into an electric signal, comprising:

a storage unit comprising a semiconductor storage device configured to hold the radiation image data;

a communication unit configured to transmit the radiation image data held in the storage unit by performing communication with one of a plurality of controllers capable of controlling said radiation detector; and a control unit configured to display, on a display unit, a message including the number of untransmitted images based on untransmitted radiation image data which the storage unit holds, based on whether the radiation image data obtained under control of a first controller is held in said storage unit at the time of connection to a second controller, wherein the control unit controls whether to permit a use of the radiation detector, in accordance with the presence/absence of untransmitted radiation image data in the storage unit, such that if the untransmitted radiation image data exists in the storage unit, the control unit disables the use of the radiation detector.

14. An imaging control method for an imaging system for capturing an image by detecting radiation from a radiation generating apparatus and converting radiation into an electric signal, by a sensor, and transmitting image data of the image captured by the sensor to a controller, the sensor comprising a storage unit comprising a semiconductor storage device configured to hold the image data of the captured image, and a transmission unit configured to transmit the image data held in the storage unit to the controller, the controller comprising a control unit configured to control whether to permit the use of the sensor, a reception unit configured to receive the image data transmitted by the transmission unit, and a generation unit configured to generate imaging data by adding imaging information to the received image data, and the control unit controls whether to permit the use of the sensor, in accordance with the presence/absence of untransmitted image data in the storage unit, such that if the untransmitted image data exists in the storage unit, the control unit disables the use of the sensor, the method comprising:

displaying, on a display unit, a message including the number of untransmitted images based on untransmitted image data which the sensor holds, based on whether the sensor already holds the captured image data at the time of connection of the sensor.

15. A non-transitory computer-readable storage medium storing a program for causing a computer to function as a controller of an imaging system for capturing an image by detecting radiation from a radiation generating apparatus and converting radiation into an electric signal by a sensor and transmitting image data of the image captured by the sensor to the controller, wherein the controller displays, on a display unit, a message including the number of untransmitted images based on untransmitted image data which the sensor holds, based on whether the sensor already holds the captured image data at the time of connection of the sensor, the sensor comprises a storage unit comprising a semiconductor storage device configured to hold the image data of the captured image, and a transmission unit configured to transmit the image data held in the storage unit to the controller, the controller comprises a control unit configured to control whether to permit the use of the sensor, a reception unit configured to receive the image data transmitted by the transmission unit, and a generation unit configured to generate imaging data by adding imaging information to the received image data, and the control unit controls whether to permit the use of the sensor, in accordance with the presence/absence of untransmitted image data in the storage unit, such that if the untransmitted image data exists in the storage unit, the control unit disables the use of the sensor.

* * * * *